Jan. 23, 1945. W. S. BRINK 2,367,828
TIRE BEAD LOCK
Filed Dec. 22, 1941 2 Sheets-Sheet 1

Inventor
WINFIELD S. BRINK

Jan. 23, 1945. W. S. BRINK 2,367,828
TIRE BEAD LOCK
Filed Dec. 22, 1941 2 Sheets-Sheet 2

Inventor
WINFIELD S. BRINK
By Ely & Frye
Attorneys

Patented Jan. 23, 1945

2,367,828

UNITED STATES PATENT OFFICE 2,367,828

TIRE BEAD LOCK

Winfield S. Brink, Akron, Ohio, assignor to The Firestone Tire & Rubber Company, Akron, Ohio, a corporation of Ohio Application December 22, 1941, Serial No. 423,913

4 Claims. (Cl. 152—401)

This invention relates to improvements to pneumatic tire and rim assemblies which are commonly termed "bead locks," said assemblies or locks being adapted to retain a pneumatic tire on its associated rim even though operated when deflated. While it is known to provide wheel constructions or assemblies for pneumatic tires wherein means are employed to clampingly engage the tire bead to the rim for retention of the tire thereon when run flat, considerable difficulty has been encountered in the assembly and disassembly of the prior structures and it is therefore a primary object of this invention to provide an improved construction permitting easy assembly and disassembly of the bead lock structure.

A further object of the invention resides in the provision of a simplified means for effectively maintaining the inner bead wall of a tire outwardly biased for engagement of the outer bead surface with the rim flanges, said means comprising a single rim maintained in proper position by being distorted from its natural shape, whereby to eliminate retention bolts, lugs, and the like.

A still further object is generally to improve and simplify the construction and operation of tire bead locks, with particular reference to bead locks adapted for association with tire mounting rims of the type wherein a pair of rims each having a bead engaging flange are clampingly engaged to provide a bead locking means while allowing easy mounting and dismounting of an associated tire when said rims are separated.

Other objects and advantages will be apparent to those skilled in the art upon examination of the specification.

In the drawings.

Like parts are identified by the same reference characters throughout the drawings and description.

Figure 3:
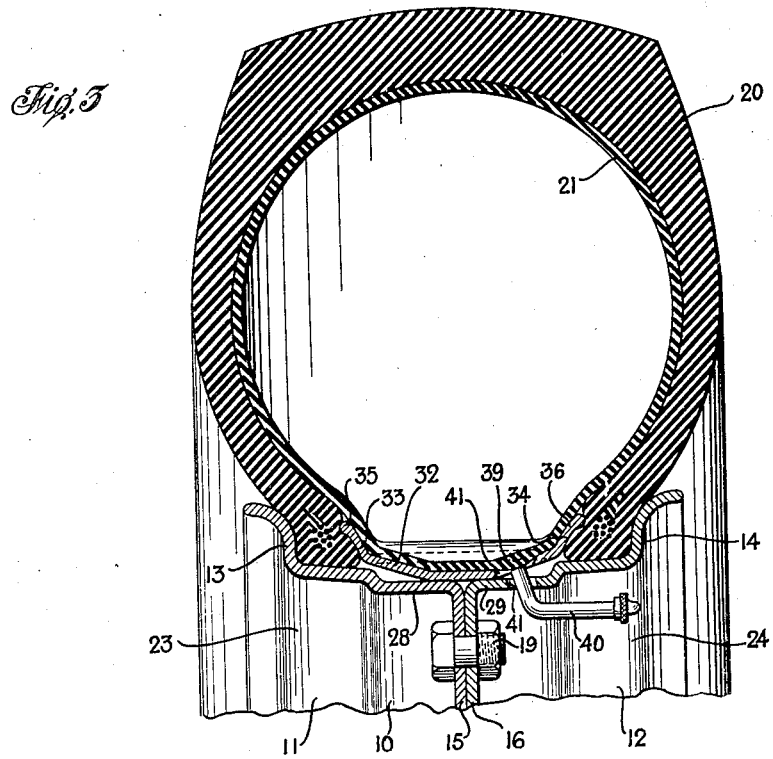
Fig. 3 is a section taken along line 3—3, Fig. 2, and showing tire and tube mounted thereon.
Figure 4:
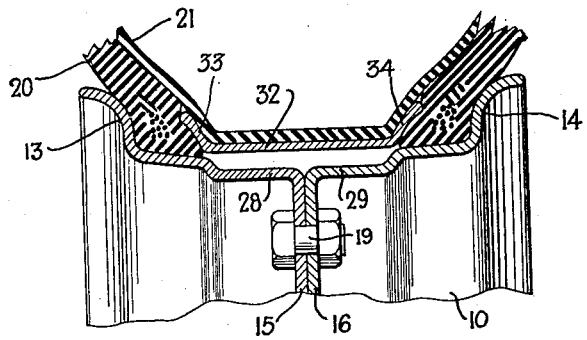
Fig. 4 is a fragmentary section along line 4—4, Fig. 2.

As best shown in Fig. 3, a tire mounting wheel rim, generically designated by reference numeral 10, comprises a pair of annular elements 11 and 12, the elements having outer marginal flanges 13 and 14 respectively, and inner flanges 15 and 16 respectively which are normally maintained clampingly engaged by a plurality of circumferentially spaced bolts 19. A tire 20 provided with an inner tube 21 is mounted on rim 10 with the outer bead walls of the tire engaging rim flanges 13 and 14 respectively and inner bead wall portions engaging rim portions 23 and 24. Rim 10 has reduced circumferential portions 28 and 29 inwardly of circumferential bead engaging portions 23 and 24 to provide a well or "drop center" portion midway between the flanges 13 and 14. Outwardly of the center portion of rim 10, is a bead locking or spreader ring 32 provided with marginal flanges 33 and 34 having rounded margins 35 and 36 clampingly engaging the inner bead walls of tire 20 to urge the tire beads outwardly against flanges 13 and 14 and thereby to prevent tire removal from the rim during operation in a deflated condition.

Figure 1:
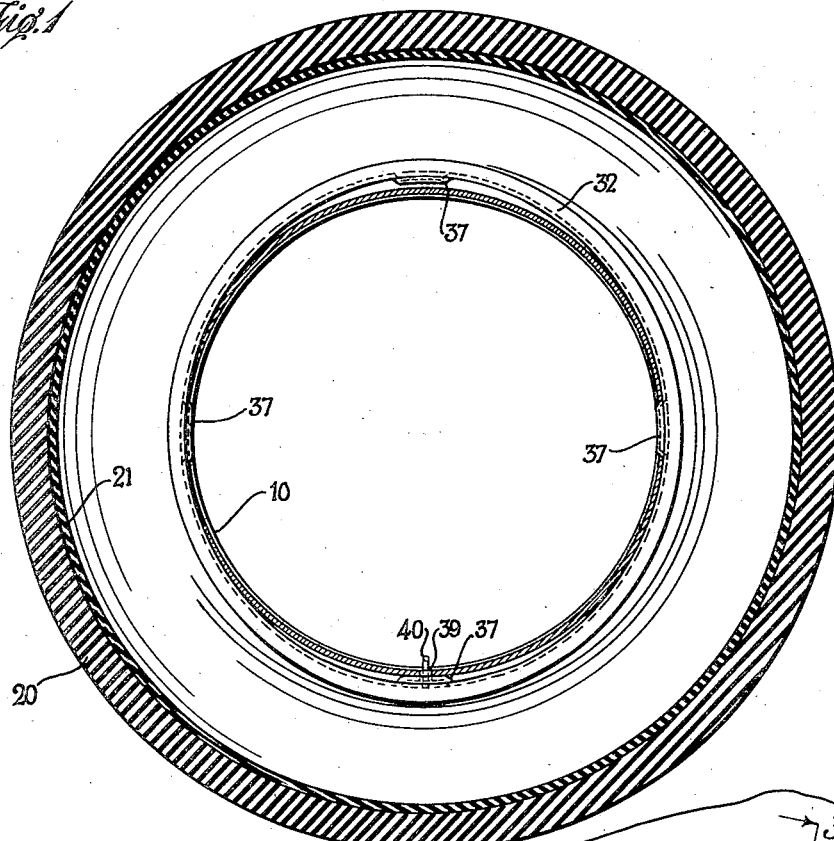
Fig. 1 shows in vertical section the improved bead lock structure during assembly thereof and before the inner bead engaging rim is sprung on to the wheel rim.
Figure 2:
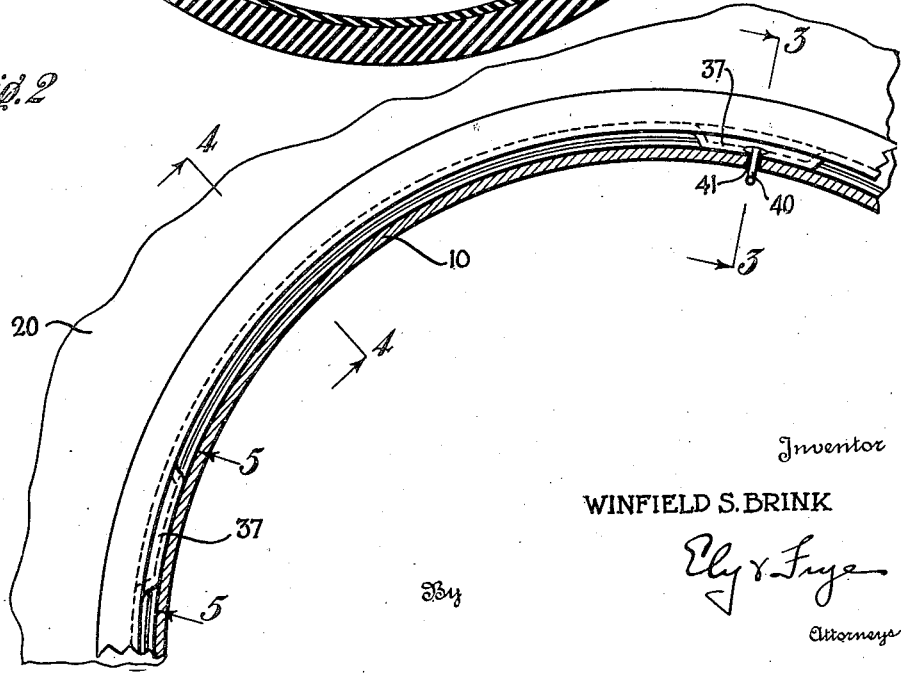
Fig. 2 is an enlarged detail showing in section a portion of the wheel rim, with the bead rim sprung thereon in a position for use.

Spreader ring 32 is normally elliptical in plan as shown in Fig. 1 to facilitate the mounting thereof over the inner portions of rim 10 and to insure substantial clamping pressure against rim 10 when wedged thereon to be distorted from its true shape.

Figure 5:
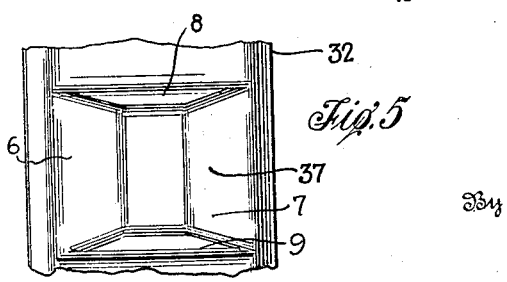
Fig. 5 is a view along line 5—5, Fig. 2.

Ring 32 is provided with a plurality, preferably four, inwardly projecting shoulder areas 37, said shoulders extending transversely thereof between the marginally flanged portions as shown in Fig. 5 and having slanting portions 6, 7, 8 and 9. One of these shoulders 37 is provided with an aperture 39 to allow projection therethrough of the inner tube valve stem 40, the valve stem, which may be offset as shown to facilitate tire inflation, also projecting through a suitable aperture 41 in the wheel rim 10.

The bead lock embodying the present invention is mounted in the assembly as follows:

A tire, as 20, with an inner tube 21 mounted therein receives the elliptical bead lock projected through the beads of the tire at right angles to the plane of the tire. The valve stem 40 of the inner tube 21 is projected through the aperture 39 as will be understood by those familiar with the art. The width of the ellipse of the bead lock being such that it contacts the beads of the tire at the narrowest width of the ellipse and accordingly the bead lock is frictionally pivoted against the beads. When the bead lock is in this position a workman doing the mounting has only to grasp one end of the bead lock and cause the bead lock to rotate about its pivotal point thus causing each end of the ellipse formed by the bead lock to approach the beads of the tire and the bead lock to progressively contact the tire beads thus gradually entering therebetween. When the said ends of the bead lock have been forced snugly against the beads the workman forces a tire tool or iron between one end of the bead lock and the bead of the tire and with little effort and slight distortion of one of the tire beads lifts a tire bead over the end of the elliptical bead lock. Next the bead lock is manually urged endwise into the tire between the tire beads a distance sufficient to afford clearance for the opposite end of the bead lock to drop between the beads of the tire. In this position the bead lock may be and is easily centered within the tire. Of course, the bead lock is still elliptical and must be mounted with the tire on the annular split tire rim 10. The bead lock has beveled inside surfaces against which the cylindrical portions 28 and 29 of the tire rim contacts and thereby affords the mechanical means and mechanical advantage so that as the elements 11 and 12 of the tire rim 10 are drawn into clamped operative position by the bolts 19 the bead lock is pressed into circular form by the circular rim wedging into the elliptical bead lock as the assembly is completed ready for inflation of the tire inner tube. Some standard tire rims, other than the split rim type, have sloping bases and, of course, the exact inner surface to be used on applicant's bead lock is dependent on the particular mounting on which it is to be used.

While the spreader ring has been described as being forced into generally circular shape, there is, of course, when shoulders 31 are used, some flattening of the arc between the rim engaging shoulders due to a slight chording action produced. It is immaterial whether or not the spreader ring assumes a true circle when forced over the rim.

While the shouldered type of expander shown is desirable, obviously the shoulders could be eliminated if desired, and other minor changes can be made without departure from the spirit of the invention.

What is claimed is:

1. A rim assembly adapted to receive a pneumatic tire normally operated inflated, but to clamp the beads thereof against removal when the tire is run flat, said assembly including a marginally flanged wheel rim comprising a pair of annular members clampingly engaged intermediate the flanges, and a spreader ring mounted over the inner wall portions of the wheel rim and having radially outwardly projecting flanges adapted to engage the inner bead walls of the tire, said spreader ring being of normally elliptical shape but being sprung into circular shape when mounted over the wheel rim to provide clamping pressure therebetween, said ring being of a width whereby upon assembly, the tire beads are firmly clamped between the wheel rim flanges and said spreader ring flanges.

2. In a device of the character described, a pneumatic tire having rim engaging beaded portions, a normally elliptical spreader ring disposed intermediate the tire beads with radially outwardly projecting flanges engaging the inner walls of the beads, a two part wheel rim disposed interiorly of the spreader ring and provided with outer marginal flanges engaging the tire beads and inner cylindrical portions engaging the spreader ring to force said ring to substantially concentric relation therewith, said rim portions being clamped to maintain the tire beads under clamping pressure between the rim flanges and the spreader ring flanges.

3. In a pneumatic tire and rim assembly adapted to be operated even when the pneumatic tire thereon is deflated, the combination with a cylindrical wheel rim having marginal flanges engaging outer bead portions of the pneumatic tire, of a normally elliptical spreader ring applied over the wheel rim in pressed relation thereto, whereby said spreader ring is forced into circular form, said spreader ring having flanges engaging the inner bead portions of said tire.

4. A bead lock of the class described comprising an outwardly opening, cross-sectionally channel-shaped, elliptical body portion, said body portion having a plurality of inwardly projecting shoulders, said shoulders being adapted to slide over a circular tire rim, whereby said bead lock is transformed from its elliptical to a circular shape.

WINFIELD S. BRINK.